United States Patent [19]

Michael

[11] Patent Number: 4,687,715
[45] Date of Patent: Aug. 18, 1987

[54] ZIRCONIUM PYROPHOSPHATE MATRIX LAYER FOR ELECTROLYTE IN A FUEL CELL

[75] Inventor: Norman Michael, Penn Hills, Pa.

[73] Assignee: Westinghouse Electric Corp., Pittsburgh, Pa.

[21] Appl. No.: 759,383

[22] Filed: Jul. 26, 1985

[51] Int. Cl.$^4$ ............................................. H01M 8/02
[52] U.S. Cl. ........................................ 429/41; 429/44; 252/520
[58] Field of Search ............................ 429/41, 44, 12; 252/520, 521, 500, 518; 423/306

[56] References Cited

U.S. PATENT DOCUMENTS

| | | | |
|---|---|---|---|
| 2,770,749 | 11/1956 | Bril et al. | 252/301.4 F |
| 3,453,149 | 7/1969 | Adlhard et al. | 429/46 |
| 3,462,314 | 5/1965 | Berger et al. | 429/193 |
| 3,931,056 | 1/1976 | Myles et al. | 252/520 |
| 3,941,715 | 3/1976 | Shidlovsky | 423/306 |
| 3,975,308 | 8/1976 | Myles et al. | 252/520 |
| 4,017,664 | 4/1977 | Breault | 429/44 |
| 4,059,679 | 11/1977 | Clearfield | 423/306 |
| 4,276,355 | 6/1981 | Kothmann et al. | 429/26 |
| 4,493,879 | 1/1985 | Kahara et al. | 429/41 |
| 4,529,671 | 7/1985 | Kahara et al. | 429/41 |

OTHER PUBLICATIONS

Chemical and Engineering News (C and EN); Oct. 16, 1961, p. 40.

Levy-Pascal et al., "Investigation of Zeolite Membrane Electrolytes for Fuel Cells", Report 108-Q3, NASA, Mar. 1963.

Primary Examiner—Anthony Skapars
Attorney, Agent, or Firm—Daniel P. Cillo

[57] ABSTRACT

A fuel cell is made, where a porous electrolyte retaining matrix layer, containing acid electrolyte, is disposed between a pair of spaced apart gas diffusion electrodes; where the matrix contains $ZrP_2O_7$ and binder, with no more than about a 10 wt. % total of the matrix containing non-binder material reactive with acid electrolyte.

21 Claims, 1 Drawing Figure

U.S. Patent     Aug. 18, 1987     4,687,715
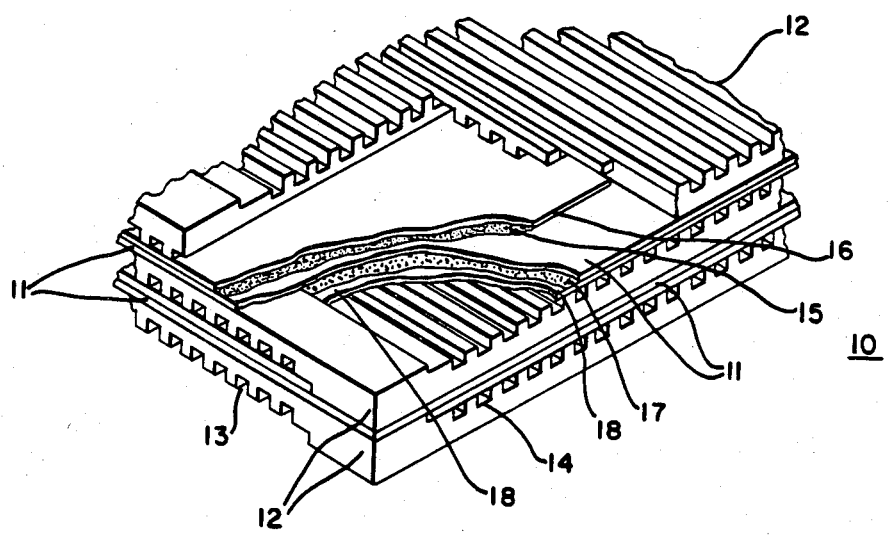

ZIRCONIUM PYROPHOSPHATE MATRIX LAYER FOR ELECTROLYTE IN A FUEL CELL

BACKGROUND OF THE INVENTION

This invention is concerned with fuel cells utilizing a liquid electrolyte and having an electrolyte containing matrix layer disposed between a gas diffusion anode electrode and a gas diffusion cathode electrode. These fuel cells can be oriented adjacent one another and electrically connected, typically in series, to form a fuel cell stack. During operation of the cells, where, for example, hydrogen and oxygen are reacted to produce electrical energy, water and heat, cooling with liquid or gaseous cooling fluids is required to maintain component integrity. An example of one type of fuel cell system configuration is taught by R. Kothmann et al., in U.S. Pat. No. 4,276,355, where the electrodes are made from a porous graphite material with a porous graphite fiber backing, and a portion of the matrix is in the form of porous graphite saturated with phosphoric acid electrolyte. Operation of such modern phosphoric acid fuel cells is usually within a temperature range of from about 175° C. to about 225° C.

In very early work in the fuel cell area, inorganic ion transport membranes were utilized to allow fuel cell operating temperatures of from about 75° C. to about 100° C. These membranes were about 0.03 inch thick and consisted of $ZrO(H_2PO_4)_2$, zirconium phosphate, i.e., zirconium orthophosphate, having active ion exchange properties, compressed under high pressure with polytetrafluoroethylene, i.e., Teflon. Each side of this inorganic ion exchange membrane was pressed to a platinum black catalyst layer and a covering platinum screen electrode. Operation was characterized as: hydrogen fuel donating an electron as the hydrogen ionized at an anode electrode screen, catalyzed by the platinum black; then, hydrated by one or more molecules of water, the hydrogen ion diffused into the ion exchange membrane and was transferred across available proton sites on the $PO_4$ groups. Such work was reported in *Chemical & Engineering News* (C&EN), Oct. 16, 1961 issue, at page 40.

A major problem with the $ZrO(H_2PO_4)_2$ ion exchange membrane was poor transverse strength, and its low maximum operational temperature of about 100° C. These problems were solved in the mid 1960's by C. Berger et al., in U.S. Pat. No. 3,462,314. C. Berger et al. taught making the inorganic ion exchange membranes by sintering a mixture containing: water balancing agent, such as aluminosilicate, aluminum sulfate, silica gel, copper sulfate, calcium chloride, and the like; water insoluble hydrous metal oxides or water insoluble acid salts, such as hydrous zirconium dioxide; and inorganic acid, such as phosphoric acid, boric acid, molybdic acid, sulfuric acid, and the like, at a temperature of from about 200° C. to 1000° C., preferably from about 300° C. to 600° C., at pressures of up to about 10,000 psi. This compacted, sintered, inorganic ion exchange membrane was then saturated with inorganic acid and resintered within the previously used temperature range, to provide strong bonding of the water balancing agent. The resintering operation provided high transverse strength and provided a membrane capable of operational temperatures up to 125° C. The examples show equal parts of ingredients, sintering at 400° C. for 5 hours and resintering at 500° C. for 2 hours, to produce an inorganic ion exchange membrane consisting essentially, of, for example, $ZrO(H_2PO_4)_2$ with bonded aluminosilicate. If any $ZrP_2O_7$ were produced, it was incidental or unnoticed, and not mentioned. This ion exchange membrane was disposed between dual, platinum black catalyst-tantalum electrode screen layers.

At about the same time as the work of C. Berger et al., O. Adlhard et al., in U.S. Pat. No. 3,453,149, taught porous matrix, acid electrolyte containing, flexible, 0.02 inch to 0.025 inch thick membranes for fuel cells, capable of operational temperatures of about 165° C. The matrix component was made from oxides, sulfates or phosphates of zirconium, tantalum, tungsten, chromium or niobium, mixed with an aqueous polytetrafluoroethylene dispersion, and phosphoric acid. These materials were homogeneously mixed, for example, 4 moles of 100% phosphoric acid to 1 mole of zirconium oxide, plus a 40% aqueous emulsion of polytetrafluoroethylene; heated at 200° C. to coagulate the polytetrafluoroethylene emulsion, which acts as a binder; and then pressed into sheet form. Platinum black powder could then be pressed at 1000 psi onto both sides of the matrix sheet, and platinum mesh screens attached on both sides to the platinum powder. At such a high molar excess of phosphoric acid, diluted with the aqueous polytetrafluoroethylene carrier, and heated at only 200° C., the matrix would presumably consist in major part of $ZrO(H_2PO_4)_2$, and unreacted ZrO, with unbound, condensed pyrophosphoric, tripolyphosphoric and tetrapolyphosphoric acids. If any $ZrP_2O_7$ were produced, it was incidental or unnoticed, and not mentioned. Such matrix membranes were relatively thick, had a cement consistency subject to cracking even with polytetrafluoroethylene inclusion, were reactive with phosphoric acid electrolyte, and still operated at a limiting, low temperature.

At a somewhat later date, as part of a NASA project dealing with sintered zeolite membranes for fuel cells, A. Levy-Pascal, C. Berger, A. Kelmers, N. Michael, and M. Plizga investigated X-ray diffraction analyses of ion exchange membranes made from a mixture of equal molar portions of $ZrO_2$, an acid stable form of zeolite $(Na_2O.Al_2O_3.nSiO_2.xH_2O)$ and $H_3PO_4$. The membranes were fired at different temperatures, and x-ray diffraction analyses were then made on the fired membranes. Membranes fired at from 300° C. to 700° C. contained $ZrO_2$, zeolite, plus unidentified phases. One membrane of the same equal molar portions of $ZrO_2$, zeolite and $H_3PO_4$ fired at 600° C. showed phases of $ZrO_2$, $ZrP_2O_7$ (zirconium pyrophosphate), and zeolite, while one other fired at 1040° C. showed phases of $ZrO_2$ and $ZrP_2O_7$ (Tables XI and XII) with all the zeolite apparently destroyed. Any zirconium pyrophosphate produced was incidental and noted in passing, but no advantageous properties were recognized. All of the fired membranes contained major amounts of unreacted $ZrO_2$. This work was reported by Levy-Pascal et al., "Investigation of Zeolite Membrane Electrolytes For Fuel Cells" Report 108-Q3, NASA, March 1963. In the membrane fired at 1040° C., with equal molar ratios of starting materials used, $ZrO_2$ seemingly would constitute from 50 wt.% to 99 wt.% of the membrane, with $ZrP_2O_7$ present at less than 50 wt.%, since 1 mole of $ZrO_2 + 1$ mole of $H_3PO_4$ could only produce ½ mole of $ZrP_2O_7$ even assuming all of the P reacts with the Zr.

Additional membrane research in the area of molecular sieve type materials. A. Clearfield in U.S. Pat. No. 4,059,679, taught preparation of crystalline materials from phosphate gels. The reflux product of zirconyl chloride and orthophosphoric acid, when washed and then dried below 100° C. was found to be a highly crystalline compound corresponding to $Zr(HPO_4)_2.H_2O$.

R. Breault, in U.S. Pat. No. 4,017,664, after reviewing the necessary properties of a phosphoric acid fuel cell matrix, i.e., it must be porous, thin, liquid permeable, wettable, have good ionic conductivity, be electrically insulative, and be chemically stable at high temperatures and open circuit potentials with a bubble pressure sufficient to prevent reactant gas crossover; rejected all prior matrix materials in favor of silicon carbide. In Breault, a 10:1 weight ratio of inert silicon carbide powder under 25 micron particle size:polytetrafluoroethylene dispersion, was applied as a layer to the surface of the catalyst side of a platinum black-polytetrafluoroethylene electrode. The layer was dried to remove water, pressed at 200 psi and sintered at 310° C. for 5 minutes, to provide a 0.04 inch thick silicon carbide-polytetrafluoroethylene matrix, essentially unreactive with phosphoric acid electrolyte and capable of operational temperatures of from about 175° C. to 200° C. While a silicon carbide matrix is well accepted, there is still need for improvement in terms of a low cost, inactive, thinner matrix material, providing high performance at higher temperatures.

SUMMARY OF THE INVENTION

The above needs have been met by providing a matrix layer containing particles of crystalline $ZrP_2O_7$ compound with electrolyte disposed in the matrix. Preferably, the matrix layer will be about 93% to about 98% by weight of insulating, refractory, inactive, inert $ZrP_2O_7$ particles and, an effective amount, about 2% to about 7% by weight of binder solids, preferably of fluorocarbon polymer, such as polytetrafluoroethylene (PTFE). The layer will be disposed between an anode electrode and a cathode electrode of a fuel cell. The $ZrP_2O_7$ constituent, i.e., crystalline, refractory, zirconium pyrophosphate, is non-conducting, is not an ion exchange material and has completely different physical and chemical properties than the more common active phosphates, $ZrO(H_2PO_4)_2$, amorphous zirconium phosphate, i.e., zirconium orthophosphate, or zirconium dioxide, i.e., $ZrO_2$, and the alumino silicate, zeolite materials commonly used in ion exchange and other prior art fuel cell membranes and matrix materials.

Preferably, essentially no $ZrO(H_2PO_4)$ or silicates, and particularly, essentially no $ZrO_2$ will be present in the phosphoric acid containing matrix layer of this invention since they are reactive with usual electrolytes. The maximum allowable total of non-binder material reactive with acid electrolyte is about 10 wt.% of the matrix layer. For example the maximum total of $ZrO(H_2PO_4)_2$ plus $ZrO_2$ plus silicate active materials in the ready to use, sintered matrix layer is about 10 wt.% of the total weight of the matrix layer including binder solids. In all instances, the maximum amount of $ZrO_2$ should not be over about 5 wt.% of the total weight of the sintered matrix layer.

In the preferred method of this invention, amorphous $ZrO(H_2PO_4)_2.nH_2O$, where n usually equals 3, is calcined at from about 1000° C. to about 1100° C., until there is no further weight loss and a completely crystalline phase, consisting of refractory $ZrP_2O_7$ is produced, usually over a time period of from about 3.5 hours to about 5 hours. Then, discrete $ZrP_2O_7$ particles, having a particle size range of from about 2 microns to about 25 microns diameter, are mixed with a dispersion of binder solids, preferably an aqueous dispersion of polytetrafluoroethylene, in a dilute solution of a thickening agent. This generally provides a thick, admixture slurry of about 93 wt.% to about 98 wt.% $ZrP_2O_7$ solids about 2 wt.% to about 7 wt.% polytetrafluoroethylene solids, with a small effective amount, up to about 3 wt.%, usually about 0.2 wt.% to 0.5 wt.%, of thickening agent, such as polyethylene oxide solids or the like, as are well known in the art, added in a 90 wt.% to 99.5 wt.% aqueous solution.

The slurry is coated onto one side of a suitable, supporting electrode substrate material by any suitable means to a thickness that will preferably provide a layer having a thickness of from about 0.002 inch to about 0.015 inch after drying and sintering. The slurry is then air dried and sintered at a temperature effective to remove thickening agent and water, and to bond the electrode substrate to the matrix layer and the matrix layer components together, usually from about 200° C. to about 400° C. This provides a 40% to 60% porous, relatively flexible, ultra-thin, refractory type matrix layer, substantially inactive, non-conductive and chemically resistant to hot phosphoric acid electrolyte during fuel cell operation of from about 175° C. to about 225° C. In some instances it may be possible to make a free standing matrix layer not bonded to the electrode, using substantially the same procedure, but coating onto a removable support. The matrix is also crack resistant during cell operation, nonpoisoning to electrode catalyst, electronically insulating, capable of excellent acid electrolyte retention, and has good resistance to reactant gas crossover between anode and cathode.

BRIEF DESCRIPTION OF THE DRAWING

For a better understanding of the invention, reference may be made to the preferred embodiment exemplary of the invention, shown in the accompanying Drawing which is a cut away view of one embodiment of a fuel cell, showing placement of the electrolyte containing matrix between the fuel cell anode and cathode.

DESCRIPTION OF THE PREFERRED EMBODIMENTS

A fuel cell is composed of a gas diffusion anode, a gas diffusion cathode, an an electrolyte disposed between the electrodes. In the phosphoric acid fuel cell, hydrogen is fed to the anode and oxygen is fed to the cathode. When the fuel and oxidant come into contact with the phosphoric acid electrolyte, the following chemical reaction occurs:

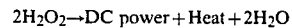

$$2H_2O_2 \rightarrow DC\ power + Heat + 2H_2O$$

Generally, the electrolyte will be contained in a porous matrix, containing one or more layers, shown as single layer 11 in the fuel cell 10 of the Drawing. Also shown are bipolar plates 12 having oxidant channels 13 and fuel channels 14. The matrix layer 11, which contains phosphoric acid electrolyte is disposed between a gas diffusion cathode-catalyst layer 15 on a supporting substrate 16 and a gas diffusion anode-catalyst layer 17 on a supporting substrate 18. A portion of the matrix contacting at least one electrode should be made of non-conductive material. A more thorough description of these various components and their operation can be found in U.S. Pat. No. 4,276,355, herein incorporated by reference.

The porous matrix layer 11 of this invention comprises discrete, insulating, refractory, inert $ZrP_2O_7$ particles in generally spherical form, having a particle size range of from about 2 microns to about 25 microns diameter, preferably from about 2 microns to about 10 microns, with electrolyte disposed in the matrix. Over about 25 microns, low bubble pressure will result in the matrix causing possible crossover of reacting gases. Under about 2 microns, the pore size of the matrix layer will be too small, causing a problem with wicking electrolyte into the matrix layer from an electrolyte reservoir. While these $ZrP_2O_7$ particles are generally contacting; an effective amount of inert, hydrophobic hot acid resistant binder material, preferably fluorocarbon such as polytetrafluoroethylene particles or fibers preferably bind the $ZrP_2O_7$ particles together, to provide good structural integrity as well as good flexibility. Phosphoric acid or other suitable electrolyte can fill the voids between the $ZrP_2O_7$ particles and the polytetrafluoroethylene in the matrix.

The matrix layer will generally be from about 2 mil to 15 mil thick and 40% to 60% porous. Preferably, the polytetrafluoroethylene materials will have a particle size range of from 0.05 micron to about 5 microns. The usual viscosity of the polytetrafluoroethylene dispersion (usually 55 wt.% to 65 wt.% solids in water) is about 20 cps, at 25° C. The electrolyte containing matrix layer will contain crystalline $ZrP_2O_7$. The matrix, in final sintered form, preferably will comprise at least about 93 wt.% $ZrP_2O_7$, most preferably about 93 wt.% to about 98 wt.% $ZrP_2O_7$, with at least about 2 wt.% binder, preferably about 2 wt.% to about 7 wt.% fluorocarbon binder. Within this range the binder is effective to provide good structural integrity combined with good porosity, wicking and flexibility. Over about 7 wt.% fluorocarbon binder and its hydrophobic properties become very apparent causing wicking problems. Less than about 2 wt.% binder, structural integrity, flexibility and porosity problems result. Other insulating, inert materials, resistant to hot acid electrolyte, such as SiC, can be added in substantial quantity without degrading the matrix layer. The SiC could substitute for part of the $ZrP_2O_7$, and remain in the matrix layer, without changing the useful character of the matrix layer. This silicon carbide is not here considered a silicate type material. During matrix fabrication, an effective amount, up to about 3 wt.% of a suitable thickening agent for the matrix composition slurry, such as polyethylene oxide can be added. The thickening agent would be lost from the matrix during sintering. It would generally be added in very dilute aqueous solution.

Preferably, the entire electrolyte matrix for the fuel cell will consist of a single layer, containing $ZrP_2O_7$ filled with electrolyte. This provides a matrix made completely from nonconducting materials. It is possible, however, to coat one of the two electrodes, preferably the cathode, with the nonconducting $ZrP_2O_7$ matrix layer of this invention—to prevent shorting between electrodes—and also use another matrix layer containing carbon particles or the like filled with electrolyte in combination with the $ZrP_2O_7$ layer.

Zirconium pyrophosphate, $ZrP_2O_7$, the matrix layer material of this invention, is very different from zirconium orthophosphate $ZrO(H_2PO_4)_2$. *The Condensed Chemical Dictionary*, 9th edition, Van Nostrand Rheinhold Co., 1977, at page 945 describes both compounds separately. In that reference work, zirconium pyrophosphate, $ZrP_2O_7$, is defined as a refractory white solid, stable to about 1550° C. and insoluble in water and dilute acids other than hydrofluoric acid. It has an almost negligible tendency to be hydrolyzed by water vapor. Zirconium phosphate is defined as zirconium orthophosphate, $ZrO(H_2PO_4)_2 \cdot 3H_2O$, a dense white amorphous powder which is soluble in acids, derived from the action of phosphoric acid on zirconium hydroxide.

The crystalline, cubic form $ZrP_2O_7$ used in the refractory type matrix of this invention is successfully produced as a relatively pure compound only by heating amorphous zirconium orthophosphate, $ZrO(H_2PO_4)_2 \cdot nH_2O$, where n usually equals 3, at from about 1000° C. to about 1100° C. preferably for at least about 3.5 hours. The $ZrP_2O_7$ formed is reported to have a linear central P-O-P group, a cubic crystal structure having a unit cell edge of 8.2 Angstrom Units, Zr-O distance of 2.02 Angstrom Units, P-O distances of 1.51 and 1.56 Angstrom Units, a calculated density of 3.19 and a refractive index of 1.657±0.003. The $ZrO(H_2PO_4)_2 \cdot 3H_2O$ orthophosphate starting material is a noncrystalline, polymeric gel type material which is reactive, and which produces inert, crystalline $ZrP_2O_7 + 5H_2O$ at 1000° C. The pyrophosphate can be further decomposed: $2(ZrP_2O_7)$ going to $(ZrO)_2P_2O_7 + P_2O_5$ at 1550° C. Both the $ZrO(H_2PO_4)_2 \cdot 3H_2O$ and $(ZrO)_2P_2O_7$ would react substantially with phosphoric acid in fuel cell operation at 200° C. $ZrO_2$ and zeolite silicates are also substantially reactive with usual fuel cell electrolyte at 200° C. The $ZrP_2O_7$ would not react with phosphoric acid to any substantial degree in fuel cell operations at 200° C.

Heating the amorphous zirconium orthophosphate at, for example, 500° C. will not provide the desired crystalline $ZrP_2O_7$, as shown in Comparative Example 1 hereinafter. In this invention, the finished matrix including binder solids can contain no more than about 10 wt.%, preferably no more than 1 wt.% total of $ZrO(H_2PO_4)_2$ plus $ZrO_2$ plus silicate active materials. Over about 5 wt.% $ZrO_2$ inclusion into the matrix could cause "at large" formation of a barrier type cement, in continuous large chunks, upon reaction with $H_3PO_4$ at fuel cell operating temperatures, altering the discrete particle form of the matrix, and harming wicking properties. Cracking of the matrix might additionally result. Over about 5 wt.% silicate, such as zeolite alumino silicate could tend to form an amorphous material upon reaction with $H_3PO_4$ at fuel cell operating temperatures, which would not function properly to provide the careful balance of properties necessary to useful matrix operation. Over about 5 wt.% $ZrO(H_2PO_4)_2 \cdot nH_2O$ would tend to form growths and bridges upon reaction with $H_3PO_4$ at fuel cell operating temperatures creating volume and porosity changes harmful to the matrix. Over about 10 wt.% of any combination of these materials will prove harmful to the fuel cell matrix operation, with the most harmful of the three being the $ZrO_2$. The use of over about 5 wt.% $ZrO_2$, use of over about 5 wt.% $ZrO(H_2PO_4)_2 \cdot nH_2O$, use of over about 5 wt.% silicate, or use of over about 10 wt.% of the combination of these ingredients, will materially change the useful character of the matrix layer in a fundamental manner. The matrix of this invention is here considered a non-active, refractory type matrix even with the inclusion of up to 7 wt.% polytetrafluoroethylene and a 10 wt.% possible inclusion of total $ZrO_2$, zirconium orthophosphate and silicate.

EXAMPLE 1

Zirconium orthophosphate, $ZrO(H_2PO_4)_2 \cdot 3H_2O$ of 99% purity (made by Magnesium Electron, Inc.) was calcined at 1000° C. in a furnace. X-ray diffraction analysis showed over 99% crystalline zirconium pyrophosphate, $ZrP_2O_7$ after sintering at 1000° C. The $ZrP_2O_7$ had a particle size range of from about 2 microns to about 10 microns after calcining.

A coating slurry was made: 98 parts by weight of the $ZrP_2O_7$ particles and 3.33 parts by weight of a 40% aqueous dispersion of polytetrafluoroethylene (2 parts by weight based on solids) having a particle size range of from 0.05 micron (sold commercially by DuPont under the tradename PTFE-30), were added to 55 parts by weight of a 99.5% aqueous solution of polyethylene oxide thickening agent (0.275 parts by weight based on solids of polyethylene oxide). The ingredients were mixed to provide a thick slurry, which was then coated onto a 12 inch × 17 inch gas diffusion cathode, made of platinum coated carbon particles bonded with polytetrafluoroethylene and laminated to a wet proofed graphite paper substrate using a K-control paper nip roll coating machine made by Testing Machine Inc.

The coating was allowed to air dry for about 2 hours and then the coated cathode was placed in a forced air oven and the coating sintered at 330° C. for 15 minutes to remove the polyethylene oxide, and water, bond the $ZrP_2O_7$ and polytetrafluoroethylene, and bond the single layered matrix to the cathode surface. The matrix was a powdery film with a certain degree of flexibility, containing bound discrete particles of $ZrP_2O_7$. After cooling, the coated electrode was weighed. The matrix coating contained 98 wt.% $ZrP_2O_7$ and 2 wt.% polytetrafluoroethylene, weighed 47.5 grams, was about 50% porous and was about 0.011 inch thick, providing an inexpensive electrolyte matrix.

The large coated cathode was cut to 2 inch × 2 inch size. The matrix coating was then impregnated with 100% phosphoric acid. The matrix demonstrated good phosphoric acid electrolyte retention and good physical integrity. The phosphoric acid containing $ZrP_2O_7$ refractory type matrix-cathode combination was paired with a gas diffusion anode and operated in a fuel cell in an air and hydrogen feed environment at 191° C. After about 140 hours at 1 atmosphere pressure, at 200 ma./sq. cm., the IR-free voltage was 680 mV. The final reading after 2,088 hours of operation was 640 mV. at 200 ma./sq. cm. During this operation, the $ZrP_2O_7$ matrix showed good integrity, exhibited excellent thermal stability, excellent chemical stability in hot 100% phosphoric acid, showed no interactions to poison the electrode catalyst, was electronically insulating, provided good resistance to reactant gas crossover between anode and cathode, and was extremely thin, providing an excellent space factor.

COMPARATIVE EXAMPLE 1

Zirconium orthophosphate, of 99% purity (sold commercially by Magnesium Electron, Inc.) was heated at 500° C. for 4 hours. X-ray diffraction analysis of the cooled material after the heating did not show any crystalline $ZrP_2O_7$ indicating an all amorphous zirconium orthophosphate structure. Such a material is found to retain ion exchange reactive sites and would be unstable in hot phosphoric acid in a fuel cell environment.

I claim:

1. A fuel cell comprising:
   (a) a pair of spaced apart electrodes;
   (b) a porous electrolyte retaining matrix layer disposed between the electrodes, said matrix layer comprising particles of a zirconium compound, wherein the zirconium compound consists essentially of $ZrP_2O_7$; and
   (c) electrolyte contained within the matrix layer.

2. The fuel cell of claim 1, wherein the matrix layer also contains binder, and the electrolyte is an acid electrolyte.

3. The fuel cell of claim 2, wherein the binder is a fluorocarbon, the electrolyte is phosphoric acid, and the matrix layer contains no more than about 5 wt.% of $ZrO_2$.

4. A fuel cell comprising:
   (a) a pair of spaced apart gas diffusion electrodes;
   (b) a porous electrolyte retaining matrix layer disposed between the electrodes, said matrix layer comprising $ZrP_2O_7$ particles and binder, with no more than about a 10 wt.% total of the matrix layer containing non-binder material substantially reactive with acid electrolyte; and
   (c) acid electrolyte contained within the matrix layer.

5. The fuel cell of claim 4, where the matrix layer contains no more than about 10 wt.% total of $ZrO_2$ + zirconium orthophosphate + silicate materials and contacts at least one electrode.

6. The fuel cell of claim 4, where the matrix layer contains a fluorocarbon binder, and any non-binder material present reactive with acid electrolyte, is reactive at the fuel cell operating temperature of from about 175° C. to about 225° C.

7. The fuel cell of claim 4, where the matrix layer comprises the entire matrix and consists essentially of from about 93 wt.% to about 98 wt.% $ZrP_2O_7$ and from about 2 wt.% to about 7 wt.% fluorocarbon binder.

8. The fuel cell of claim 7, where the matrix contains no more than a 1 wt.% total of $ZrO_2$ plus zirconium orthophosphate plus silicate materials.

9. The fuel cell of claim 4, where the acid is phosphoric acid.

10. The fuel cell of claim 4, where the $ZrP_2O_7$ of the matrix is in the form of discrete particles having a particle size range of from about 2 micron to about 25 microns.

11. In a fuel cell comprising a plurality of electrodes having at least one electrolyte retaining matrix layer disposed between said electrodes, wherein the improvement comprises a matrix layer comprising particles of $ZrP_2O_7$, with no more than about 5 wt.% of $ZrO_2$.

12. The fuel cell of claim 11, where fluorocarbon binder is included in the matrix layer, the electrolyte is phosphoric acid, the matrix layer contains no more than about a 10 wt.% total of $ZrO_2$ + zirconium orthophosphate + silicate materials, and the particles of $ZrP_2O_7$ have a particle size range of from about 2 microns to about 25 microns.

13. A gas diffusion electrode having disposed thereon a porous, refractory type matrix layer capable of containing electrolyte, said matrix layer comprising discrete, sintered $ZrP_2O_7$ particles having a particle size range of from about 2 microns to about 25 microns, and from about 2 wt.% to about 7 wt.% of acid resistant polymer binder, with no more than about a 10 wt.% total of $ZrO_2$ plus zirconium orthophosphate plus silicate materials.

14. The matrix layer of claim 13, where the matrix layer is 40% to 60% porous, comprises the entire matrix and consists essentially of from about 93 wt.% to about 98 wt.% $ZrP_2O_7$ and from about 2 wt.% to about 7 wt.% fluorocarbon polymer binder.

15. The matrix layer of claim 14, containing less than a 1 wt.% total of $ZrO_2$ plus zirconium orthophosphate, plus silicate materials.

16. A matrix, capable of containing acid electrolyte and suitable for use in a fuel cell, comprising discrete, sintered particles of a zirconium compound, wherein the zirconium compound consists essentially of $ZrP_2O_7$ particles having a particle size of from about 2 microns to about 25 microns, and from about 2 wt.% to about 7 wt.% of acid resistant polymer binder, where the matrix is from 40% to 60% porous.

17. The matrix of claim 16 containing fluorocarbon binder, with no more than about a 10 wt.% total of the matrix containing non-binder material substantially reactive with acid electrolyte.

18. The matrix of claim 16, where the binder is a fluorocarbon and the matrix contains no more than about a 10 wt.% total of $ZrO_2$+zirconium orthophosphate+silicate materials.

19. The matrix of claim 16, supported by a substrate material.

20. A matrix, capable of containing electrolyte and suitable for use in a fuel cell, comprising discrete, sintered particles of $ZrP_2O_7$ having a particle size of from about 2 microns to about 25 microns, and from about 2 wt.% to about 7 wt.% of fluorocarbon polymer binder, with no more than about 5 wt.% of $ZrO_2$.

21. The matrix of claim 20, supported by a substrate material, where the matrix is from 40% to 60% porous.

* * * * *